United States Patent
Takaya

(10) Patent No.: US 6,800,240 B2
(45) Date of Patent: Oct. 5, 2004

(54) METHOD FOR MANUFACTURING CERAMIC RESISTOR

(75) Inventor: Shigeki Takaya, Nagano (JP)

(73) Assignee: K-Tech Devices Corp. (JP)

( * ) Notice: Subject to any disclaimer, the term of this patent is extended or adjusted under 35 U.S.C. 154(b) by 0 days.

(21) Appl. No.: 10/275,841

(22) PCT Filed: Nov. 7, 2001

(86) PCT No.: PCT/JP01/09704
§ 371 (c)(1),
(2), (4) Date: Nov. 12, 2002

(87) PCT Pub. No.: WO02/43082
PCT Pub. Date: May 30, 2002

(65) Prior Publication Data
US 2003/0141958 A1 Jul. 31, 2003

(30) Foreign Application Priority Data

Nov. 27, 2000 (JP) .................................. 2000-360197

(51) Int. Cl.⁷ ............................................. C04B 33/32
(52) U.S. Cl. ....................................... 264/616; 264/614
(58) Field of Search ................................. 264/614, 616

(56) References Cited

U.S. PATENT DOCUMENTS 5,620,642 A  *  4/1997  Kamite et al.
6,010,661 A  *  1/2000  Abe et al.
2001/0004855 A1  *  6/2001  Fukuda et al.

FOREIGN PATENT DOCUMENTS

| JP | 55-108707 | 8/1980 |
| JP | 55-108708 | 8/1980 |
| JP | 02-272701 | 11/1990 |
| JP | 06-104102 | 4/1994 |
| JP | 07-082033 | 3/1995 |
| JP | 09-173810 | 7/1997 |

OTHER PUBLICATIONS

English translation of Examination Report in Japanese counterpart application PCT/JP01/09704.
International Search Report for PCT/JP01/09704.
International Search Report—PCT/JP01/09704; ISA/JPO, Feb. 1, 2002.

* cited by examiner

Primary Examiner—Christopher A. Fiorilla
(74) Attorney, Agent, or Firm—Harness, Dickey & Pierce, P.L.C.

(57) ABSTRACT

A method for manufacturing a ceramic resistor wherein the resisting material of the resistor is a ceramic material prepared by a method comprising the steps of providing four or more types of substance, compound, or composite as starting raw materials, admixing the starting raw materials, forming the resultant mixture, and firing the formed material, characterized in that the admixing step is carried out in a mixing vessel (1) by the use of a first agitating blade (2) as a means for allowing the starting materials to flow over the whole mixing vessel and a second agitating blade (3) as a means for diaggregating the aggregates of the starting materials. The method can be employed for suppressing the variation of resistance values.

5 Claims, 2 Drawing Sheets

METHOD FOR MANUFACTURING CERAMIC RESISTOR

This application is a 371 of PCT/JP01/09704 filed Nov. 7, 2001.

TECHNICAL FIELD

The present invention relates to a ceramic resistor comprising a ceramic acting as a resistor material and a method for manufacturing the same.

BACKGROUND ART

Ceramic resistors formed of a compound and/or a complex compound containing at least four metallic and/or metalloid elements including Mg and Si have been disclosed in Japanese Unexamined Patent Application Publication Nos. 2-272701, 6-104102, and the like.

These ceramic resistors have resistance against high voltage pulses and high power surges, and also have thermal resistance because their main constituent is ceramic. Thus, they have particular advantages which other resistors do not have.

The methods disclosed in the above-mentioned publications include a step of mixing at least four starting materials (each containing a different element) for 20 hours with a ball mill. If the starting materials were sufficiently mixed, the variation in resistance values of resistors with identical specifications mass-produced from the starting materials would be reduced. However, mixing with a ball mill is not sufficient to reduce the variation in the resistance values.

Accordingly, an object of the present invention is to reduce the variation in resistance values of a ceramic resistor comprising a ceramic acting as a resistor material containing a compound and/or a complex compound containing at least four metallic and/or metalloid elements.

DISCLOSURE OF INVENTION

In order to solve the problem described above, the present invention is directed to a method for manufacturing a ceramic resistor containing a ceramic acting as a resistor material. The method includes a step of mixing starting materials including at least four metallic and/or metalloid (for example, Si, but hereinafter Si is regarded as a metal in the description) simple substances, compounds, or complex compounds. A forming step and a firing step follow the mixing step. In the mixing step, means for allowing the starting materials to flow in a whole mixing vessel 1 and means for breaking up aggregates of the starting materials are used.

In order to prepare a ceramic comprising a compound and/or a complex compound containing at least four metallic and/or metalloid elements, a plurality of starting materials are generally used. Those starting materials are generally powders, and they are mixed, subjected to forming, and fired, thus resulting in a ceramic. When the ceramic formed of a compound and/or a complex compound containing at least four metallic and/or metalloid elements is prepared, the above-described mixing step is important. This is because, if the starting materials are, subjected to forming and firing with specific elements (starting materials) aggregated, the resulting ceramic does not exhibit desired characteristics. As described above, when electric characteristics of a ceramic are exploited in, for example, ceramic resistors comprising the ceramic acting as the resistor material, the above described step is particularly important.

It is considered that the known mixing method using a ball mill hardly helps break up aggregates. This is because (1) dry mixing is liable to cause static electricity which induces aggregation; and (2) once the staring materials adhere and aggregate to the inner wall of a mixing vessel or balls formed of ceramic or the like used for a ball mill, it is difficult to break up aggregates of the starting materials. These two reasons (1) and (2) are cited.

Accordingly, the mixing step in the method of the present invention is carried out using means for allowing the staring materials to flow in the whole mixing vessel 1 and means for breaking up aggregates of the starting materials in the mixing vessel 1. The means for allowing the starting materials to flow in the whole mixing vessel 1 is, for example, a first agitating blade 2 shown in FIG. 1 revolving at a relatively low speed (20 to 50 rpm) while rotating at a relatively low speed (1 to 30 rpm). "Revolving" means shifting the rotation axis along a face defined by the rotation direction.

The means for breaking up aggregates in the mixing vessel 1 is, for example, a second agitating blade 3 shown in FIG. 1 rotating at a high speed (2000 to 6000 rpm) to locally agitate the starting materials. Mixing time depends on conditions (rotation speed, revolution speed, viscosities of the materials, and the like), and is generally 10 to 30 minutes. It goes without saying that more time may be spent.

First, using the means for allowing the starting materials to flow in the whole mixing vessel 1, the starting materials are roughly uniformized in the vessel. In addition, aggregates of specific starting materials are sent one after another to the means for breaking up the aggregates, which will be described later. The means for allowing the starting materials to flow may have a function of breaking up the aggregates, but it not necessary. Next, using the means for breaking up the aggregates of the starting materials in the mixing vessel 1, physical shock is given to the aggregates of starting materials to be dispersed. By using these two means, the starting materials can be uniformly dispersed in the whole mixing vessel 1 while the aggregates are being broken up. Hence, an extremely uniform mixture can be prepared.

When a large amount of ceramic resistor material is prepared by subjecting the uniform mixture of the starting materials to forming and firing, the variation in resistance values of the resulting ceramic resistor material can be reduced. The reasons will now be described.

The electrical conduction mechanism of ceramic resistors is base on movement of free electrons and positive holes (carriers) resulting from an incomplete covalent bond between elements. This incomplete covalent bond is formed when compounds each containing an element capable of forming a compound having a different valence are covalent-bonded to each other. If an aggregate of specific starting materials (identical types of metals or metallic compounds) is fired and sintered without being broken, the covalent bond is completely formed in the aggregate, and consequently, carriers hardly move. Thus, the aggregate is liable to prevent electrical conduction. In general, free electrons easily move in comparison with positive holes. Therefore, by forming many regions where free electrons can easily move, the regions can facilitate the electrical conduction. Also, ease of the movement of holes depends on the manner of formation of the holes. Considering all of these factors, it is difficult to reduce the variation in resistance values of the ceramic resistor material unless excellent uniform of the mixture is achieved.

The inventors of the present invention discover a certain degree of correlation between the uniformity and the temperature coefficient of resistance of the ceramic resistor material. The temperature coefficient of resistance (TCR) here represents a rate of change in resistance with temperature (unit: ppm/° C.) when resistance is measured at 25 and 125° C. in accordance with Section 5. 2. 3 of JIS C 5202. If excellent uniformity is achieved, it leads to a higher temperature coefficient of resistance ("higher" here means that a temperature coefficient of resistance changes toward positive values (see FIG. 4)).

In the ceramic resistor formed of a ceramic, acting as a resistor material, containing a compound and/or a complex compound containing at least four metallic and/or metalloid elements, a temperature coefficient of resistance capable of leasing to a reduced variation in resistance values is: 1150 ppm/° C. when the specific resistance of the resistor material is 1 kΩ·cm or less; −1300 ppm/° C. or more when the specific resistance of the resistor material is in the range of 1 to 8 kΩ·cm; −1450 ppm/° C. or more when the specific resistance of the resistor material is in the range of 8 to 30 kΩ·cm; −1530 ppm/° C. or more when the specific resistance of the resistor material is in the range of 30 to 70 kΩ·cm; and −1620 ppm/° C. or more when the specific resistance of the resistor material is 70 kΩ·cm or more. Such temperature coefficients of resistance are an index for determining whether the above-described excellent uniformity is achieve.

Specifically, by satisfying the above-described relationships between the specific resistance and the temperature coefficient of resistance, the variation in resistance values of the ceramic resistor formed of a ceramic acting as a ceramic resistor material containing a compound and/or a complex compound containing at least four metallic and/or metalloid elements can be reduced.

The resistor material contains, for example, Mg and Si. These elements are easily available, and a compound and/or a complex compound containing these elements and other metallic and/or metalloid elements advantageously results in a resistor material capable of providing a wide range of specific resistances.

When Mg and Si are necessary for the resistor material, at least two other metallic and/or metalloid elements of the compound and/or complex compound contained in the resistor material may be at least one selected from the group (first group) consisting of Ca, Zn, Sr, Cd, and Ba; at least one selected from the group (second group) consisting of Sn, Al, Sb, Ga, Pb, Cr, Mn, and Ge; and at least one selected from the group (third group) consisting of Bi, Nb, Ta, V, W, and Mo. The ceramic resistor of the present invention may contain other elements and their compound and/or complex compound as impurities, as long as they do not have serious influence on temperature coefficients of resistance nor do they reduce the effect of reducing the variation in resistance values.

The first group includes alkaline-earth metals. Cd in this group has a harmful effect on the environment. Preferably, at least one selected from Ca, Zn, and Ba is used, from the viewpoint of availability.

The second group includes amphoteric metals. Pb in this group has a harmful effect on the environment. Preferably, at least one selected from Sn, Al, Sb, and Mn is used, from the viewpoint of availability.

The third group includes elements capable of forming compounds having a valence of three or five. Preferably, at least one selected from Bi, V, and W is used, from the viewpoint of availability. By using a ceramic formed of a compound and/or a complex compound containing elements selected from these three groups, Mg, and Si as a resistor material, the resulting ceramic resistor can have resistance against high voltage pulses and high power surges and provide a wide range of specific resistances.

Figure 1:
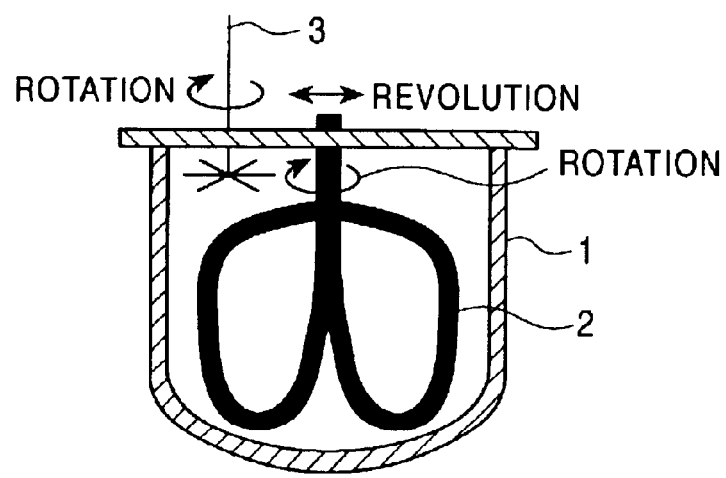
FIG. 1 is an illustration of an agitating apparatus according to the present invention.

Reference Numerals are each designate as follows: 1: mixing vessel, 2: first agitating blade, 3: second agitating blade.

BEST MODE FOR CARRYING OUT THE INVENTION

Examples of the present invention will now be described.
(Preparation of Sample A)

(i) a mixture of MgO, SiO$_2$, and a complex compound containing Mg and Si, (ii) CaCO$_3$, (iii) BaCO$_3$, (iv) Sn$_2$O$_3$, and (v) Sb$_2$O$_3$ were prepared. These materials were compounded at a ratio by weight of (i):(ii):(iii):(iv):(v)= 14:78:1:2:4. Relative to 100 parts by weight of these metallic compounds, 1 part by weight of CMC (carboxymethylcellulose), 21 parts by weight of water, 2 parts by weight of ethylene glycol were added. These starting materials were placed in a mixing vessel 1. Then, a first agitating blade 2 in the mixing vessel 1 was rotated at 2 to 3 rpm and revolved at 40 rpm under a reduced pressure, thus allowing the starting materials to flow in the whole mixing vessel 1. Also, a second agitating blade 3 was simultaneously rotated at a high speed of 6000 rpm to mix the starting materials, thus breaking up aggregates of the starting materials. The maximum diameter defined by the rotation of the first agitating blade 2 was 240 mm, the maximum diameter defined by the rotation of the second agitating blade 3 was 40 mm, and the diameter of the revolution was 60 mm. The pressure in the vessel was reduced to a level at which the paste of the starting materials to be mixed can be degassed. Mixing time was set at about 20 minutes. Thus, the starting materials were formed into a degassed clay-like mixture.

The paste (clay-like) mixture after the mixing step was formed in a specific cylindrical shape. After being air-dried, the product was fired in the atmosphere for a total of 16 hours including two-hour staying at 1380° C. or less. As a result, the CMC and water evaporated completely, and the starting materials resulted in a metallic sintered composite, that is, a ceramic. Silver paste was applied to and fixed on both ends of the cylindrical ceramic, and thus a ceramic resistor of the present invention was obtained.
(Preparation of Sample B)

(i) a mixture of MgO, SiO$_2$, and a complex compound containing Mg and Si, (ii) CaCO$_3$, (iii) BaCO$_3$, (iv) SnO$_2$, (v) Sb$_2$O$_3$, and (vi) Bi$_2$O$_3$ were prepared. These materials were compounded at a ratio by weight of (i):(ii):(iii):(iv): (v):(vi)=66:13:4:11:1:4. Relative to 100 parts by weight of these metallic compounds, 2 part by weight of CMC (carboxymethylcellulose) and 28 parts by weight of water are added. These starting materials were placed in the mixing vessel 1. Then, a ceramic resistor of the present invention was obtained, through the same steps as in Sample A.

(Preparation of Sample a)

The same starting materials were compounded at the same ratio as in Sample A, except that the water content was 100 parts by weight relative to 100 parts by weight of the metallic compounds. Then, the starting materials were placed in a cylindrical mixing vessel containing many ceramic balls having a diameter of 30 mm, and were thus mixed by so-called ball milling. Mixing time was 20 hours. After being mixed, the metallic compounds were dehydrated to be dried, and then 1 part by weight of CMC, 21 parts by weight of water, and 2 parts by weight of ethylene glycol were added to 100 parts by weight of the metallic compounds. Then, in order to control viscosity so that forming can be carried out, the metallic compounds were slightly kneaded with the CMC and the other materials including water under atmospheric pressure for 40 to 60 minutes using a kneader. Next, the materials were degassed under a reduced pressure, and then were subjected to forming and firing as in Sample A, thus resulting in a ceramic resistor of Sample a.

(Preparation of Sample b)

The same starting materials were compounded at the same ratio as in Sample B, except that the water content was 100 parts by weight relative to 100 parts by weight of the metallic compounds. Then, a ceramic resistor of Sample b was obtained through the same steps as in Sample a.

(Sample Evaluation)

Figure 2:
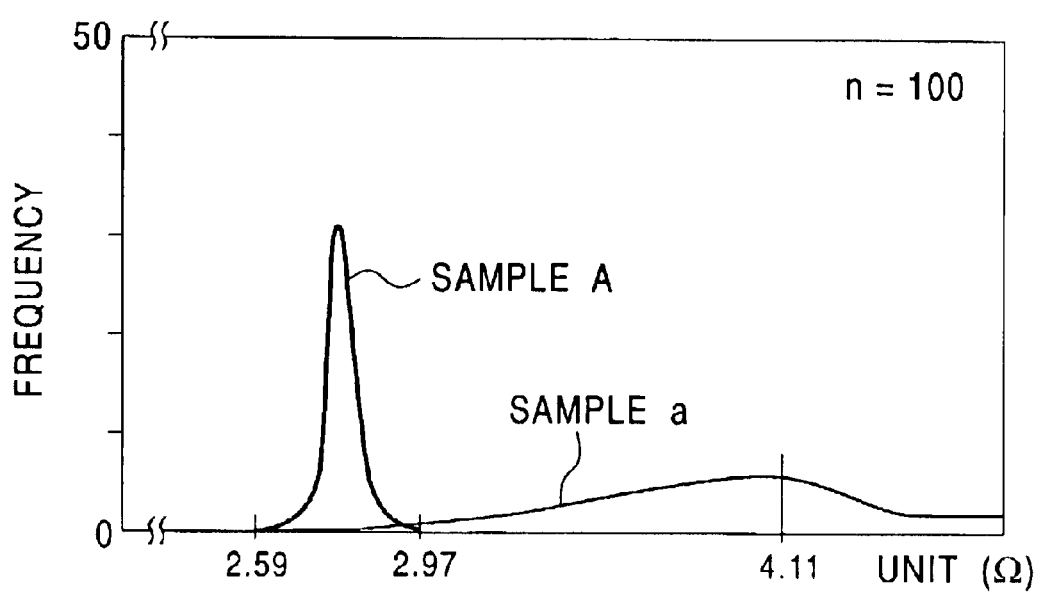
FIG. 2 is a graph showing the variations of resistance values of ceramic resistors of the present invention and known ceramic resistors.
Figure 3:
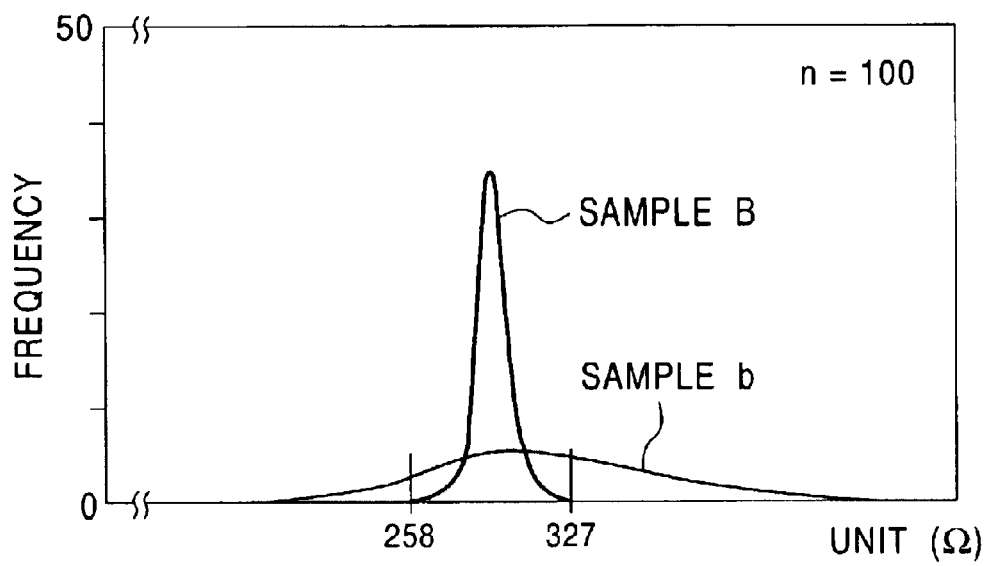
FIG. 3 is a graph showing the variations of resistance values of ceramic resistors of the present invention and known ceramic resistors.

Samples A, B, a, and b were subjected to measurement of resistance values (n=10). FIG. 2 is a histogram showing the variations in resistance values of Samples A and a, and FIG. 3 is a histogram showing the variations in resistance values of Samples B and b. As shown in these drawings, the variations in resistance values of Samples A and B according to the present invention is dramatically reduced in comparison with those of samples a and b prepared by the known method.

While the mixing time for Samples A and b according to the present invention was about 20 minutes, the mixing time for Samples a and b by the known method was 20 hours. This suggests that, by applying the present invention, the time for manufacturing ceramic resistors was extremely reduced.

(Preparation of Other Samples)

In the same method as in Sample A, the contents by weight of a mixture of MgO, $SiO_2$, and a complex compound containing Mg and Si, $CaCO_3$, $BaCO_3$, $Sn_2O_3$, and $Sb_2O_3$ were controlled so that ceramic resistors having specific resistances of 1.5 Ω·cm (corresponding to Sample A), 10 Ω·cm, 100 Ω·cm, and 1 kΩ·cm were obtained.

Also, in the same method as in Sample B, the contents by weight of a mixture of MgO, $SiO_2$, and a complex compound containing Mg and Si, $CaCO_3$, $BaCO_3$, $SnO_2$, $Sb_2O_3$, and $Bi_2O_3$ were controlled so that ceramic resistors having specific resistances of 8 kΩ·cm, 30 kΩ·cm, 70 kΩ·cm, and 160 kΩ·cm (corresponding to Sample B) were obtained.

In the same method as in Sample a, the contents by weight of a mixture of MgO, $SiO_2$, and a complex compound containing Mg and Si, $CaCO_3$, $BaCO_3$, $Sn_2O_3$, and $Sb_2O_3$ were controlled so that ceramic resistors having specific resistances of 1.5 Ω·cm (small amount is obtained by the method of Sample a), 10 Ω·cm, 100 Ω·cm, and 1 kΩ·cm were obtained.

In the same method as in Sample b, the contents by weight of a mixture of MgO, $SiO_2$, and a complex compound containing Mg and Si, $CaCO_3$, $BaCO_3$, $SnO_2$, $Sb_2O_3$ and $Bi_2O_3$ was controlled so that ceramic resistors having specific resistances of 8 kΩ·cm, 30 kΩ·cm, 70 kΩ·cm, and 160 kΩ·cm (small amount is obtained by the method of Sample b) were obtained.

Guidance for controlling the contents by weight will now be described to such an extent that persons skilled in the art can operate. If the total content of the mixture of MgO, $SiO_2$, and a complex compound of Mg and Si, $CaCO_3$, $BaCO_3$, and $Bi_2O_3$ is increased, the specific resistance of the resulting resistor increases. In contrast, if the total contend of the other starting materials is increased, the specific resistance of the resulting resistor decreases. By controlling the contents of the starting materials, target specific resistances can be achieved.

(Temperature Coefficients of Resistance of Other Samples)

The prepared samples other than Samples A, a, B, and b were subjected to measurement of temperature coefficients of resistance (TCR) at temperatures in the range of 25 to 125° C. The results (n=10) are shown in FIG. 4.

In samples having an identical specific resistance, temperature coefficients of resistance is compared between the resistors prepared according to the present invention and the resistors prepared by the known method. As a result, the resistors according to the present invention exhibit temperature coefficients higher than those of the resistors by the known method by 150 to 300 ppm/° C.

Figure 4:
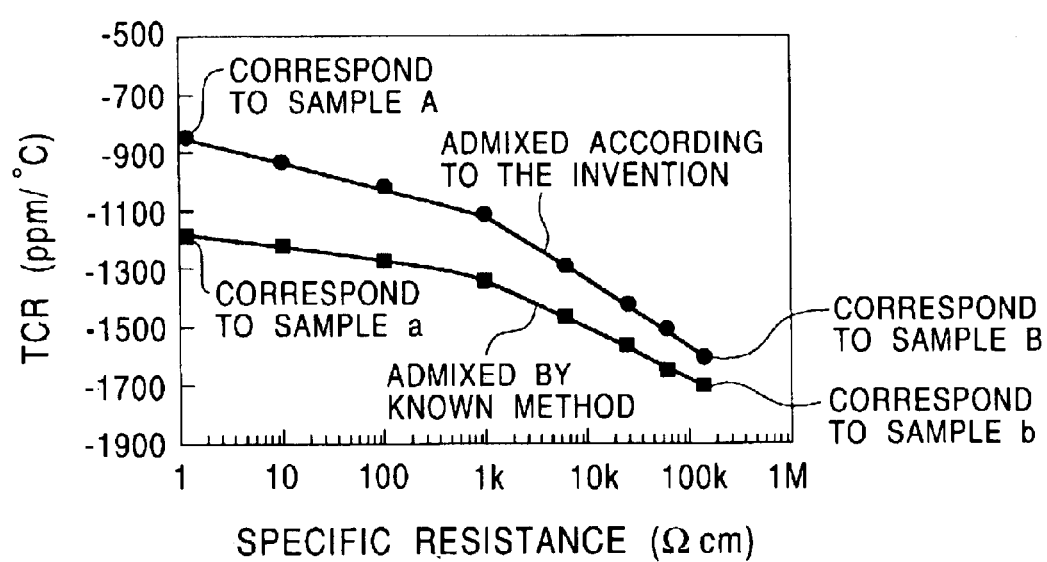
FIG. 4 is a graph showing the relationships between the specific resistance and the temperature coefficient of resistance (TCR) in ceramic resistor materials prepared by known mixing method and a mixing step according to the present invention.

FIG. 4 shows that the resistors prepared through the mixing step of the present invention generally have the following relationships (1) to (5) between the specific resistances and the temperature coefficients of resistance.

(1) A resistor material having a specific resistance of 1 kΩ·cm or less results in a resistor having a temperature coefficient of −1150 ppm/° C. or more.

(2) A resistor material having a specific resistance of 1 to 8 kΩ·cm results in a resistor having a temperature coefficient of −1300 ppm/° C. or more.

(3) A resistor material having a specific resistance of 8 to 30 kΩ·cm results in a resistor having a temperature coefficient of −1450 ppm/° C. or more.

(4) A resistor material having a specific resistance of 30 to 70 kΩ·cm results in a resistor having a temperature coefficient of −1530 ppm/° C. or more.

(5) A resistor material having a specific resistance of 70 kΩ·cm or more results in a resistor having a temperature coefficient of −1620 ppm/° C. or more.

(Supplemental Description on the Examples)

The Examples illustrate only the ceramic resistors prepared by mixing and firing the starting materials including a mixture of MgO, $SiO_2$, and a complex compound of Mg and Si; $CaCO_3$; $BaCO_3$; $Sn_2O_3$; and $Sb_2O_3$ at predetermined compounding ratios and by mixing and firing the starting materials including a mixture of MgO, $SiO_2$, and a complex compound of Mg and Si; CaO; BaO; $SnO_2$; $Sb_2O_3$; and $Bi_2O_3$ at predetermined compounding ratios. However, it is considered that, by manufacturing ceramic resistors containing at least four metallic or metalloid elements, other than the Examples, according to the method of the present invention, the variation in resistance values of the resulting resistors can be reduced.

Those resistors containing at least four metallic or metalloid elements may be formed of a compound and/or a complex compound containing Mg; Si; at least one element selected from the group consisting of Ca, Zn, Sr, Cd, and Ba; at least one element selected from the group consisting of Sn, Al, Sb, Ga, Pb, Cr, Mn, and Ge; and at lest one element selected from the group consisting of Bi, Nb, Ta, V, W, and Mo.

For example, in Sample B, a small amount of $WO_3$ may be added, or $Bi_2O_3$ may be replaced with a small amount of $WO_3$. In this instance, a higher $WO_3$ content increases the specific resistance of the resulting resistor.

In the Examples, the pressure of the mixing vessel was reduced when the staring materials were mixed. The mixtures of the examples contained water and CMC, and thus became paste. Bubbles therefore easily occur in the mixing step. The purpose of this pressure reduction is degassing. However, degassing in the mixing step is not necessary. Alternatively, a degassing step may follow the mixing step, or degassing may be performed in a forming step using a forming apparatus having a pressure reducing function. However, it is preferable to perform degassing simultaneously in the mixing step, from the viewpoint of reduction of manufacturing time.

In the Examples, the agitating blade (the first agitating blade 2 shown in FIG. 1) to rotate and revolve at relatively low speeds was used as means for allowing starting materials to flow in a whole mixing vessel, but it is not limited to this agitating blade. For example, by repeatedly hitting the paste mixture of starting materials or turning it upside down with a large hammer like a pounder used for making rice cake, the starting materials can be allowed to flow in the whole mixing vessel.

In the Examples, the agitating blade (the second agitating blade 3 shown in FIG. 1) to rotate at a relatively small rotation diameter and a high speed was used as a means for breaking up the aggregates of the starting materials in the mixing vessel, but it is not limited to this agitating blade. For example, by applying an ultrasonic wave to the starting materials from the inside or outside of the mixing vessel, the aggregates of the starting materials can be broken up.

In the Examples, the resistor material was formed in a cylindrical shape. However, considering ease of operation of a mounter used for mounting resistors, the resistor material may be formed in a plate and the resulting resistor may be formed in a chip.

In the Examples, the starting materials resulted in a clay-like mixture by the mixing step, before the forming step, but they may result in a flaky mixture, that is, many flakes containing the starting materials. It is considered that such a flaky mixture is obtained by the mixing step according to the present invention with the water content reduced. The flaky mixture is likely to help overcome disadvantages resulting from the forming step, or back end step, in which the clay-like mixture is subjected to forming, and those disadvantages include, for example, difficulty in controlling the amount of the clay-like mixture supplied to a forming apparatus and difficulty in allowing the supply to smoothly proceed in order to automatize the forming step.

In the Examples, the mixing vessel contained water from the beginning of the mixing step, but this is not necessary. For example, it has been found that, in Samples A and B, the aggregation of the starting materials is more suppressed when the starting materials are mixed in the mixing vessel not containing water at first (for about 20 minutes). The mixing conditions are set as follows: while the first agitating blade 2 is rotated at a speed of 2 to 3 rpm and revolved at a speed of 40 rpm and the second agitating blade 3 is rotated at a high speed of 6000 rpm, the starting materials are mixed at the beginning of the mixing step; after water is placed in the mixing vessel in an amount equivalent to that of Sample A or B, mixing is continued for 10 minutes; and then, mixing is performed for 10 minutes using only the first agitating blade, with the second agitating blade stopped. Under these conditions, aggregates resulting from the occurrence of static electricity was not observed (a small amount of aggregates may have occurred, but it was negligible), and thus much preferred mixture was obtained. Whether the mixture was preferable was determined by elementary analysis of the cross section of the resulting ceramic resistor after the firing step. In Samples A and B, small amounts of aggregates of $CaCO_3$, $BaCO_3$, and Sn oxide out of the starting materials were observed. However, by mixing the starting materials without water, substantially no aggregate was observed.

There was a difference, between when the small amounts of aggregates were observed and when they were not, whether the fired ceramic had small cavities or not. When the aggregates were observed, the fired ceramic had small cavities; when aggregates were not observed, the fired ceramic did not have any cavity. The reasons have not yet become clear, but it is considered that the difference in thermal shrinkage between the aggregates and the other portions of the starting materials is involved in this. Such a difference did not affect the temperature coefficients of resistance (FIG. 4) and the variation in resistance values (FIGS. 2 and 3). This is provably because a very small amount of cavities was involved in aggregation. Unfortunately, the presence of cavities is likely to reduce the strength of ceramic resistors, even if the amount of cavities is very small. However, there was no difference in a strength test. This is provably because the presence ratio of cavities was very small. Even though the difference is not exhibited, it is, of course, preferable that resistors do not have any cavity, from the viewpoint of easy supply and use of the resistors.

Also, a more preferred mixture, that is, a more reduced amount of aggregates of specific starting materials, was achieved by making the particle size of $BaCO_3$ in the starting materials of Samples A and B small in advance. The reasons also have not yet become clear, but it is considered that the particle size of $BaCO_3$ was slightly larger than that of the other materials. There was a difference, between when small amounts of the aggregates were observed and when they were not, whether the fired ceramic locally exhibited a small amount of stains or not. When the aggregates were observed, the fired ceramic exhibited the stains; when aggregates were not observed, the fired ceramic did not exhibit any stain. According to the elementary analysis, the portions having the stains mainly contained a Ba compound. These stains did not affect the temperature coefficients of resistance (FIG. 4) and variation in resistance values (FIGS. 2 and 3) described above. This is provably because the amount of stains involved in the aggregation was very small.

INDUSTRIAL APPLICABILITY

According to the present invention, the variation in resistance values of a ceramic resistor formed of a ceramic acting as a resistor material containing a compound and/or a complex compound containing at least four metallic and/or metalloid elements can be reduced. Also, by applying the method for manufacturing a ceramic resistor of present invention, time for manufacturing the ceramic resistor can be extremely reduced in comparison with the known method.

What is claimed is:

1. A method for manufacturing a ceramic resistor comprising a ceramic acting as a resistor material, the method comprising:

a mixing step of mixing starting materials including at least four metallic and/or metalloid simple substances, compounds, or complex compounds into a mixture;

a forming step of forming the mixture into a shape; and a firing step of firing the shape into a composite, wherein the mixing step is performed using a low-speed agitation blade which revolves and rotates for allowing the starting materials to flow in a whole mixing vessel, and a high-speed agitation blade which rotates for breaking up an aggregate of the starting materials in the mixing vessel.

2. A method for manufacturing a ceramic resistor according to claim 1, wherein the mixing step is performed in the mixing vessel under a reduced pressure.

3. A method for manufacturing a ceramic resistor according to claim 1, wherein the mixing step comprises the sub steps of mixing the starting materials in the mixing vessel without water;

placing water in the mixing vessel after a predetermined time has elapsed; and mixing the starting materials.

4. A method for manufacturing a ceramic resistor according to claim 1, wherein the mixture comprises a paste or a flaky mixture by the mixing step, before the forming step.

5. A method for manufacturing a ceramic resistor according to claim 1, wherein the starting materials include a compound and/or a complex compound containing Mg and Si;

a compound and/or a complex compound containing at least one element selected from the group consisting of Ca, Zn, Sr, Cd, and Ba;

a compound and/or a complex compound containing at least one element selected from the group consisting of Sn, Al, Sb, Ga, Pb, Cr, Mn, and Ge; and a compound and/or a complex compound containing at least one element selected from the group consisting of Bi, Nb, Ta, V, W, and Mo.

* * * * *